US006190492B1

(12) United States Patent
Byrne et al.

(10) Patent No.: US 6,190,492 B1
(45) Date of Patent: Feb. 20, 2001

(54) DIRECT NOZZLE PLATE TO CHIP ATTACHMENT

(75) Inventors: John Clowry Byrne; Steven Robert Komplin; Ashok Murthy, all of Lexington, KY (US)

(73) Assignee: Lexmark International, Inc., Lexington, KY (US)

( * ) Notice: Under 35 U.S.C. 154(b), the term of this patent shall be extended for 683 days.

(21) Appl. No.: 08/539,892

(22) Filed: Oct. 6, 1995

(51) Int. Cl.[7] ........................ B32B 31/00

(52) U.S. Cl. ........................ 156/273.7; 29/890.01; 29/890.1; 156/273.9; 347/47

(58) Field of Search ........................ 156/273.7, 273.9; 347/47; 29/890.01, 890.1

(56) References Cited

U.S. PATENT DOCUMENTS

| | | |
|---|---|---|
| 4,666,823 | 5/1987 | Yokota et al. . |
| 5,305,015 | 4/1994 | Schantz et al. . |
| 5,408,738 * | 4/1995 | Shast et al. ........................ 347/47 |
| 5,434,607 | 7/1995 | Keefe . |

FOREIGN PATENT DOCUMENTS

| | | |
|---|---|---|
| 57-70612 * | 5/1982 | (JP) ........................ 156/273.9 |
| 03106657 | 7/1991 | (JP) . |

* cited by examiner

*Primary Examiner*—John J. Gallagher
(74) *Attorney, Agent, or Firm*—John A. Brady

(57) ABSTRACT

Separate adhesive is avoided in the manufacture of a thermal ink jet printhead by positioning a thermoplastic nozzle plate (1) on a semiconductor circuit chip (3) and electrically firing the ink ejection resistors (5) in a controlled amount to melt the lower surface in contact with the chip while not damaging the body of the nozzle plate. The resistors are fired in their intended pattern of operation during use so not to damage the resistors. Additional resistors may be added just for this bonding operation if needed with particular chip designs.

4 Claims, 2 Drawing Sheets

DIRECT NOZZLE PLATE TO CHIP ATTACHMENT

TECHNICAL FIELD

This invention relates to thermal ink jet printheads, and, more specifically, relates to such printheads having a nozzle plate attached to a semiconductor chip having drop-ejection heating elements.

BACKGROUND OF THE INVENTION

Plastic nozzle plates that have ink chambers and conduits built-in need a means of attachment to the underlying semiconductor chip. In current designs, the chambers and other ink flow features are created by essentially conventional photo etching using a thick film photoresist layer applied to a semiconductor chip. Photoresist remaining after the imaging and etching operation is left in place and used as an adhesive layer.

The remaining photoresist is an effective adhesive because current techniques only partially cure the thick film photoresist. The lack of complete cross linking of the resist layer imparts an adhesive property to it which is used for bonding the nozzle plate down by applying temperature and pressure.

To reduce costs and to eliminate a major source of misalignment between the ink heaters or chambers and nozzle holes, it is desirable to use a single-structure nozzle plate with integrated flow features and nozzle holes built in. Several techniques may be utilized to achieve the integrated nozzle plate, such as laser machining and injection molding. In each case it is generally possible to apply an adhesive layer for connection of the nozzle plate to the underlying semiconductor chip. Heat and pressure can be applied to activate such adhesive since the nozzle plates, although they are polymer films, may be made of selected polymer materials which do not melt or degrade at the temperatures required.

Such an added layer is costly in terms of material and operation steps. Moreover, certain molded plastics, typically those of homogeneous polymeric material, cannot be used at such temperatures because the nozzle plate would melt or deform. Moreover, it is also difficult, if not impractical, to apply the adhesive layer to individual film nozzle plates after their manufacture.

Accordingly, it is the primary feature of this invention that a separate adhesive layer is avoided in the bonding of a film nozzle plate to a semiconductor chip having drop-ejection heaters for nozzles of the nozzle plate.

This invention employs adhesion by melt contact. It is widely known that such adhesion is a function of roughness or irregularity of the surfaces involved, and a preliminary roughening step may be employed in accordance with this invention.

DISCLOSURE OF THE INVENTION

In accordance with this invention, an individual thin film nozzle plate is placed on the semiconductor chip accurately positioned to form an ink jet printhead. Pressure, which may be moderate is applied, and resistors on the chip are driven in a controlled manner to a temperature to melt just the surface of contact between the chip and the nozzle plate, without any of the body of the nozzle plate reaching that temperature for a time in which it would be deformed or degraded. This may be by use of the drop-ejecting heaters or also with additional heaters added to the chip for the purpose of the bonding step.

Although surface roughness is often desirable for bonding laminations, no roughening step is necessary or practiced in the embodiments contemplated by this invention.

BRIEF DESCRIPTION OF THE DRAWING

The details of this invention will be described in connection with the accompanying drawing, in which.

BEST MODE FOR CARRYING OUT THE INVENTION

Figure 1:
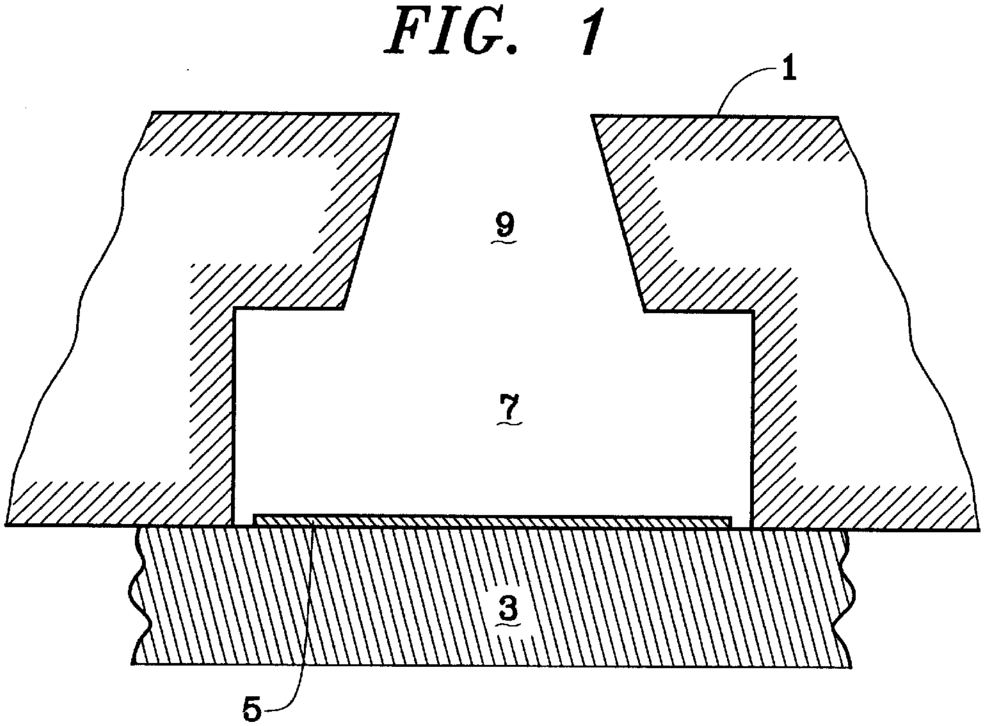
FIG. 1 is a cross section of the nozzle plate on the semiconductor chip.

FIG. 1 illustrates the thermoplastic nozzle plate 1, which may be an injection molded sheet entirely of polysulfone (but which may be any suitable thermoplastic). The plate 1 is shown with its lower surface in contact with the upper surface of semiconductor circuit chip 3 having a thin film resistor 5 positioned under an open chamber 7 in plate 1. Chamber 7 connects to a smaller tapered nozzle hole 9.

As is conventional, in normal use aqueous ink jet ink fills chamber 7 and nozzle 9. Resistor 5 is fired by electrically driving it with a pulse of current to expel a dot of ink for printing, the heat of resistor 5 being sufficient to form a vapor bubble in chamber 7 which forces ink out of the nozzle 9 and on to paper or other media (not shown) positioned proximate to nozzle 9.

Figure 2A:
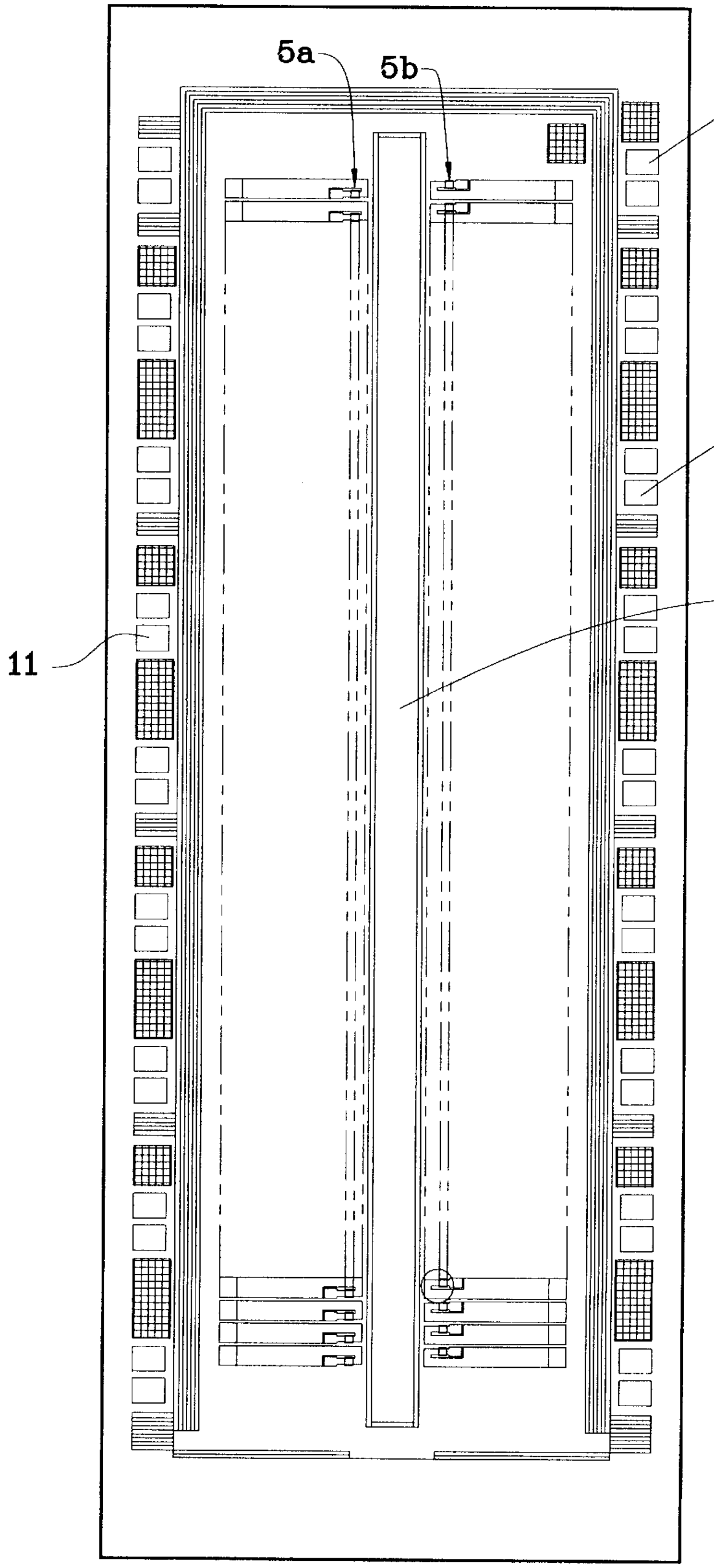
FIG. 2*a* and FIG. 2*b* illustrate the semiconductor chip alone.
Figure 2B:
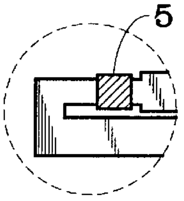

FIG. 1 shows a single nozzle 9. The actual ink jet print head, as is conventional, has a large number of nozzles 9 in a column, each with a resistor 5 on chip 3. Nozzle plate 1 is a single member containing all of these nozzles 9. FIG. 2*a* illustrates a representative chip 3. The resistors 5 (FIG. 2*b*) are closely spaced in two columns, 5*a* and 5*b*. Electrical contact pads 11 to receive electrical power to drive resistors 5 are located around the periphery of chip 3. Chip 3 is populated with control leads and drive FET transistors to electrically drive resistors 5 as essentially conventional and therefore are not shown in detail. Chip 3 has a long central channel 13 which extends entirely through chip 3. Ink jet ink passes through channel 13 to supply ink to the chambers 7, as is conventional.

Figure 3:
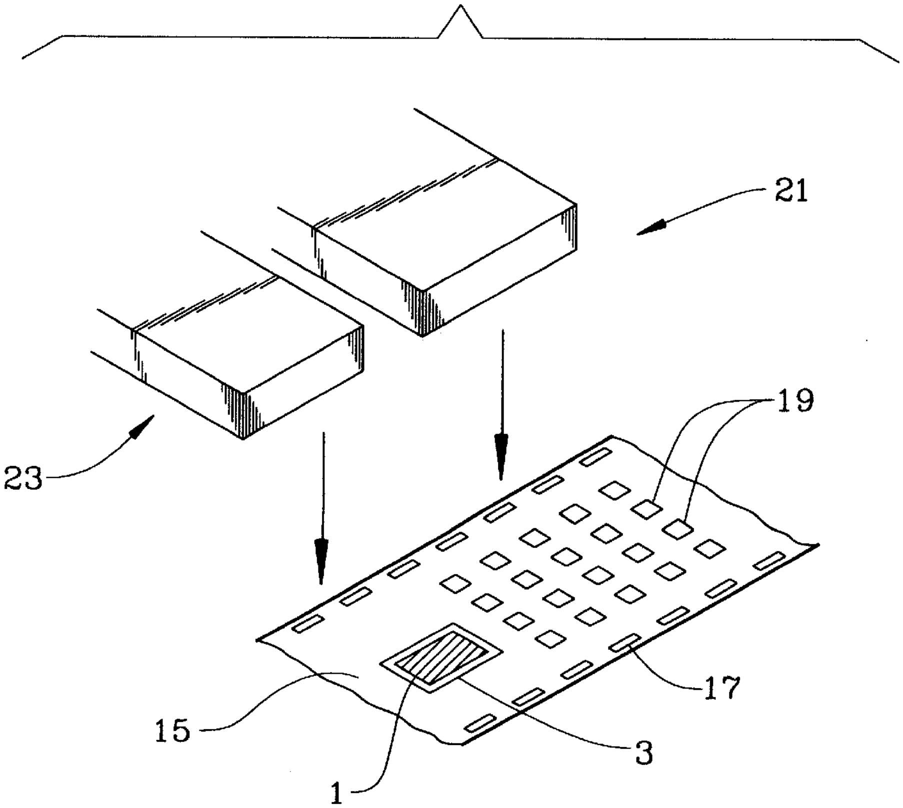
FIG. 3 illustrates the bonding step.

FIG. 3 illustrates the nozzle plate 1 and chip 3 in a representative bonding operation. At the time shown in FIG. 3, chip 3 is permanently bonded to flexible electrical circuit 15 by conductive tabs from circuit 15 being thermally fused to the contact pads 11 (FIG. 2) of chip 3 (commonly known as tab bonding). The flexible circuit 15 is moved to the process station by use of sprocket holes 17. Electrical connecting pads 19 are connected to leads on the opposite side of tape 15 which are connected by the tab bonding to contact pads 1 1 of chip.

Nozzle plate 1 is correctly positioned over chip 3 as shown by a vacuum holding alignment device, not shown. As suggested in FIG. 3, an electrical drive connector 21 moves down to make electrical contact with the pads 19 while a pressure pad 23 moves down to hold nozzle plate 1 with moderate pressure against chip 3.

Resistors 5 are then driven in accordance with this invention for melting the lower surface of nozzle plate 1 to the upper surface of chip 3. All of the resistors 5 in columns 5*a* and 5*b* are fired through control signals applied from connection 21, but not simultaneously as the chip 1 is designed for staggered firing of resistors 5. The firing pattern for resistors 5 may be simply that for the printing of solid patters in which all of the nozzles 9 on nozzle plate 1 are to expel ink. Such pattern may vary with different designs of the chip 1, but in each case it is the maximum heating which the resistors 5 on chip 1 can provide within the limits imposed to protect chip 1 from damage. Alternatively, additional heater resistors may be added to chip 1 for other purposes or just for the bonding purpose of this invention, and these may be driven along with or instead of resistors 5 to distribute the heat.

Firing of resistors 5 and any other resistors during the bonding step is limited to bring only the lower surface layer of nozzle plate 1 to the melting temperature of plate 1, and is then terminated. The bulk of nozzle plate 1 remains cold and does not melt, thereby retaining its shape integrity, nor is it degraded by heat effects.

After a brief period for cooling the pressure pad 23 is moved away. The nozzle plate 1 is firmly bonded to chip 3. This is accomplished without separate adhesive and with no change to the chip 1 or at most, the inexpensive addition of some resistors to chip 1 located to improve melting where experiments on specific chips 1 indicate a need for additional heating for this bonding operation.

Alternatively, this invention can be employed to temporarily tack a nozzle plate 1 in place on a chip 3. After aligning an adhesive coated nozzle plate 1 to the chip 3, the resistor 5 and any additional resistors can be fired to melt that adhesive. This avoids activating the adhesive until later in the process.

Although a slight roughening of a surface is known generally as desirable to increase the mechanical bonding of the contiguous layers, no roughening step is contemplated with the embodiments of this invention.

Alternatives and modifications can be anticipated. Patent coverage is sought as provided by law, with particular reference to the accompanying claims.

What is claimed is:

1. The process of bonding a nozzle plate of thermoplastic material melting at a first temperature to a surface of a semiconductor circuit chip having closely spaced resistors and circuitry to electrically drive said resistors for vaporizing ink jet ink to make a thermal, ink jet printhead comprising positioning said nozzle plate on said surface of said chip in alignment to form said printhead, then pressing said nozzle plate against said chip while electrically driving said resistors in a manner sufficient to bring the part of said nozzle plate in close contact with said surface of said chip to said first temperature to bond said nozzle plate by melting said part of said nozzle plate and terminating said electrical driving before any of the remainder of said nozzle plate reaches said first temperature for a time sufficient to degrade or deform the body of said nozzle plate.

2. The process as in claim 1 in which said resistors are fired in a pattern suitable for printing for which said chip is designed.

3. The process as in claim 2 in which said chip has additional resistors located to effect said bonding, and electrically driving said additional resistors and said resistors for vaporizing ink to bring said part to said first temperature and terminating said electrical driving of said additional resistors and said resistors for vaporizing ink before any of the remainder of said nozzle plate reaches said first temperature for a time sufficient to degrade or deform the body of the said nozzle plate.

4. The process as in claim 1 in which said chip has additional resistors located to effect said bonding, and electrically driving said additional resistors and said resistors for vaporizing ink to bring said part to said first temperature and terminating said electrical driving of said additional resistors and said resistors for vaporizing ink before any of the remainder of said nozzle plate reaches said first temperature for a time sufficient to degrade or deform the body of the said nozzle plate.

* * * * *